United States Patent [19]

Nakagawa et al.

[11] Patent Number: 5,479,529
[45] Date of Patent: Dec. 26, 1995

[54] CHARACTER AND FORTUNE TELLING METHOD AND APPARATUS FOR HOBBY USE

[75] Inventors: Masamichi Nakagawa, Hirakata; Yoshiyasu Kado; Kunino Nobori, both of Kadoma, all of Japan

[73] Assignee: Matsushita Electric Industrial Co., Ltd., Osaka, Japan

[21] Appl. No.: 158,636

[22] Filed: Nov. 29, 1993

[30] Foreign Application Priority Data

Nov. 30, 1992 [JP] Japan .................. 4-320230

[51] Int. Cl.⁶ .................................... G06K 9/00
[52] U.S. Cl. ................ 382/118; 382/203; 273/161
[58] Field of Search ........................ 382/2–16, 118, 382/100, 190, 203; 340/825.34; 273/161

[56] References Cited

U.S. PATENT DOCUMENTS

| | | | |
|---|---|---|---|
| 4,827,532 | 5/1989 | Bloomstein | 382/41 |
| 4,841,575 | 6/1989 | Welsh et al. | 382/2 |
| 4,975,969 | 12/1990 | Tal | 382/2 |
| 5,008,946 | 4/1991 | Ando | 382/2 |
| 5,012,522 | 4/1991 | Lambert | 382/2 |
| 5,283,644 | 2/1994 | Maeno | 382/2 |

OTHER PUBLICATIONS

Kobayashi et al., "The Recognition of Basic Facial Expressions by Neural Network", 1991 IEEE Int. Joint Conf. Neural Net.., Nov. 1991, pp. 460–466.

Evans, "Some Fair Fortune Tellers Go High Tech", Palm Beach Post, Jan. 1991, p. 413.

Oda et al., "A Pattern Recognizing Study of Palm Reading", IEEE Trans. Systems, Man & Cybernetics, Apr. 1971, pp. 171–175.

Wong et al., "A System for Recognising Human Faces", Int. Conf. on Acoustics, Speech and Signal Processing, IEEE, vol. 3, May 1989, pp. 1638–1642.

Mannaert et al., "A Self–Organizing System for Object Analysis and Identification", IJCNN Int. Joint Conf. on Neural Networks, IEEE, vol. 2, Jun. 1990, pp. 819–824.

Fukuda et al., "Recognition of Human Face Using Fuzzy Inference and Neural Network", Proc. IEEE Int. Workshop on Robot and Human Communication, Sep. 1992, pp. 375–380.

*Primary Examiner*—Michael I. Razavi
*Assistant Examiner*—Jon Chang
*Attorney, Agent, or Firm*—Ratner & Prestia

[57] ABSTRACT

A character and fortune telling apparatus for hobby use comprises an input unit for generating a two-dimensional image based on a person's face, a feature extraction unit for extracting the coordinates and distances expressing the shapes and positions of the features of the face, from the two-dimensional image, and an output unit for producing personal information about a person from the extracted features, and for outputting the information on an appropriate output device.

4 Claims, 4 Drawing Sheets

CHARACTER AND FORTUNE TELLING METHOD AND APPARATUS FOR HOBBY USE

FIELD OF THE INVENTION

The present invention relates to a character and fortune telling method and apparatus for hobby use, and in particular to a method and apparatus for presenting personal information about a person by using features extracted from the facial image of the person.

BACKGROUND OF THE INVENTION

Game machines exist which input characters, numbers, direction, or magnitude by using devices such as switches, keyboards, levers, or balls, in amusement apparatuses which operate in response to user input.

In game machines which are used, for example, for providing horoscopes and matchmaking, a birthday is entered using numeric keys and a name is entered using character keys. On the basis of these inputs, a fortune-telling database is searched, and a corresponding message is displayed on a display device printed by a printing device.

Thus, in conventional amusement apparatuses, the input may be limited to manual entry. This input method may be difficult for those not accustomed to keyboard input. In addition, the input information may be limited to such parameters as birthday, blood type, sex, and name, and the message outputs as a result of this processing may tend to be monotonous.

SUMMARY OF THE INVENTION

An exemplary embodiment of the present invention comprises an input unit for generating a two-dimensional image of a person's face, a feature extraction unit for extracting coordinates and distance expressing the shape and position of facial features from the two-dimensional image, and an output unit for producing personal information about the person from the extracted features.

More specific constitution and effects of the invention will be better understood and appreciated from the following detailed description.

BRIEF DESCRIPTION OF THE DRAWINGS

FIG. 3 (B) is a flow chart showing a procedure for performing calculations relating to texture information of face.

DESCRIPTION OF THE PREFERRED EMBODIMENTS

Figure 1:
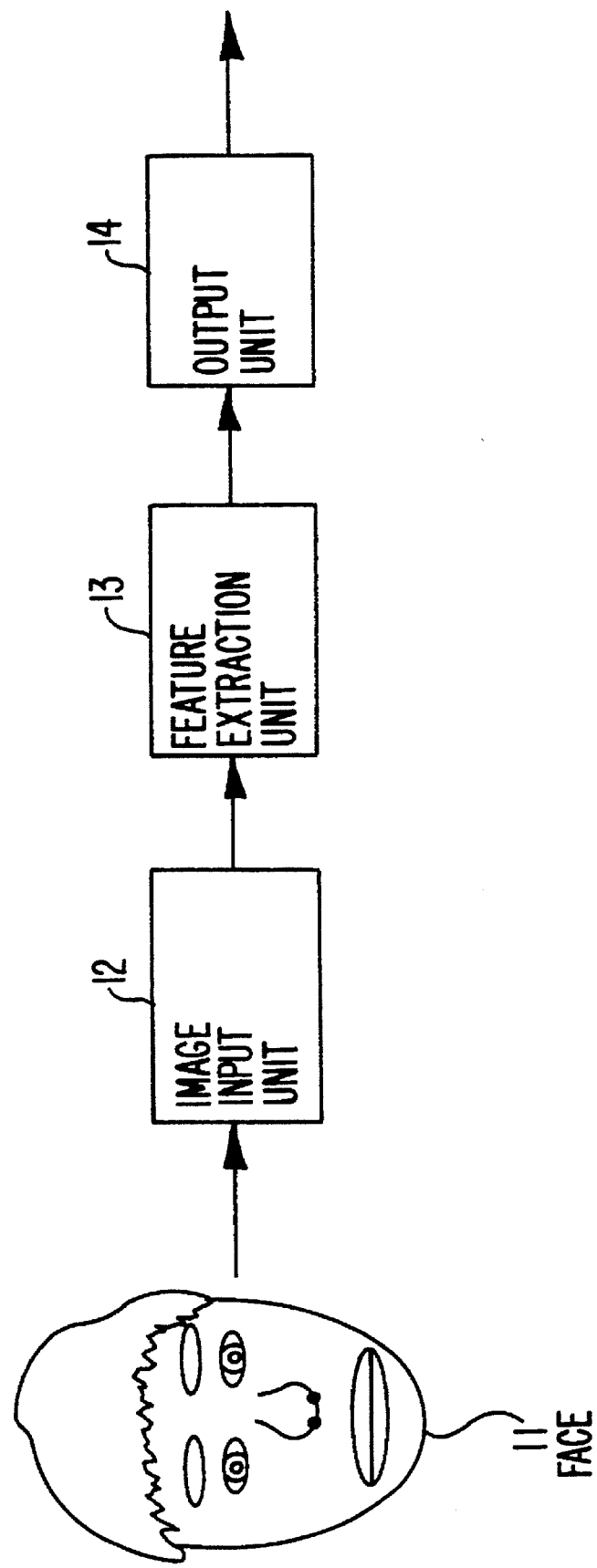
FIG. 1 is a block diagram of an amusement apparatus according to an exemplary embodiment of the present invention.

FIG. 1, illustrates a first exemplary embodiment of the present invention, In FIG. 1, a two-dimensional image of a person's face 11 is provided by an image input unit 12. The image input unit 12 comprises a television camera for taking an optical image of a person which is the object, and an image scanner for handling the photographic image. A feature quantity extraction unit 13 extracts features of the facial image of the output of the image input unit 12. Features are extracted, for example, as set forth in U.S. Pat. No. 4,975,969 which is incorporated herein by reference and Japanese Patent Laid-Open No. 63-177273 which is incorporated herein by reference. The extracted features are sent to an output unit 14. The output unit 14 forms information including the personal message corresponding to the facial image depending on the feature, and the formed information is sent to a display unit or a printing unit.

The embodiment is further described by reference also to FIG. 2 to FIG. 4.

Figure 2:
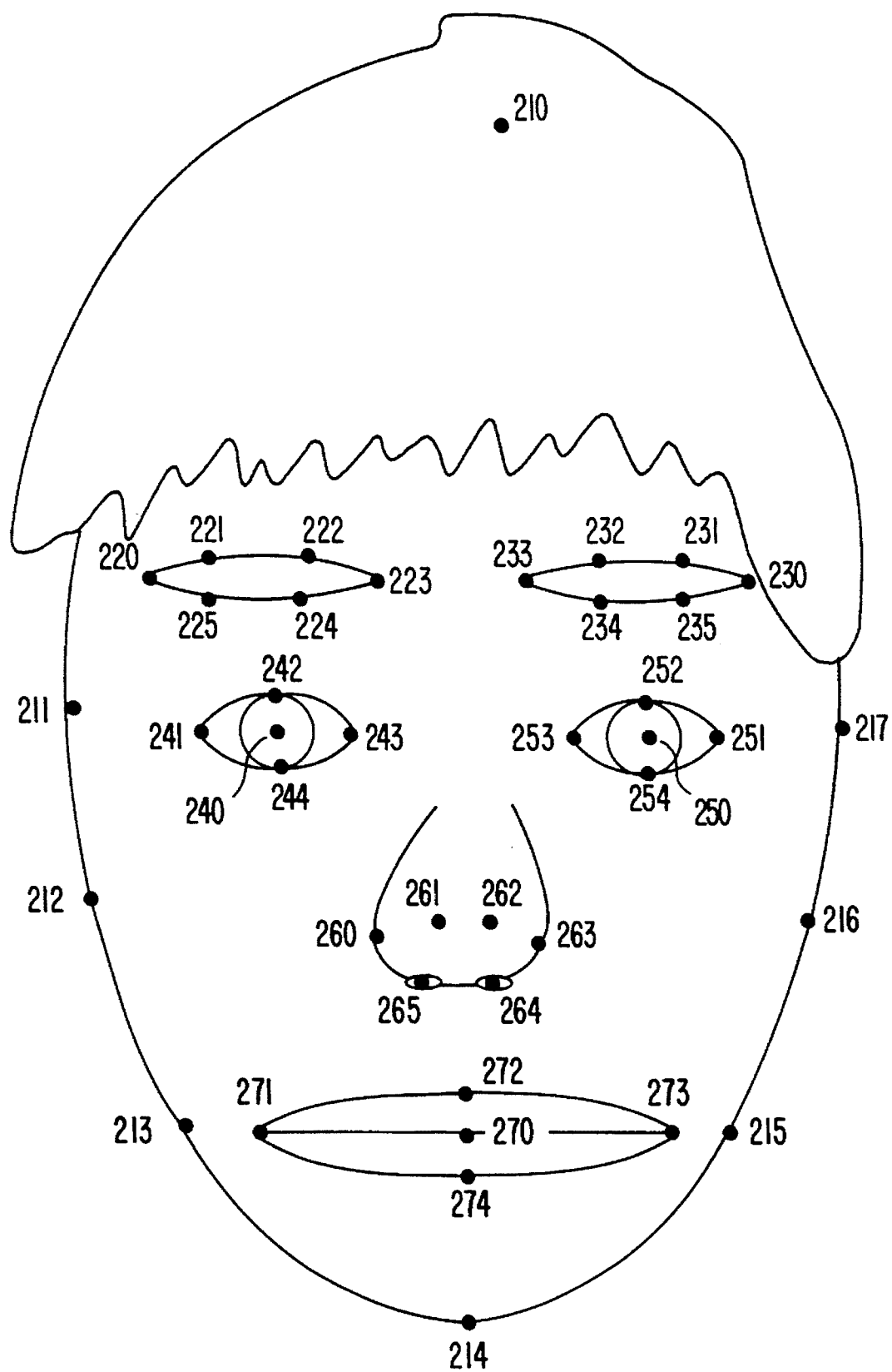
FIG. 2 is a schematic diagram showing the shape and position of facial features which form a facial image.

FIG. 2 is a schematic diagram showing the features of shape and position of elements for forming a facial image. In FIG. 2, the two-dimensional coordinates represented by black spots are features of elements. FIG. 2 shows the contour 210 to 217, right brow 220 to 225, left brow 230 to 235, right eye 240 to 244, left eye 250 to 254, nose 260 to 265, and mouth 270 to 274. That is, the eyes have the coordinates at both ends, top and bottom in the central part, and center of the eyeball as the features. The lateral width of the right eye can be calculated from the distance between points 241 and 243, and the interval of the right and left eyes is calculated from the distance between points 240 and 250. The measured data are normalized on the basis of the length or the lateral width of a face, and used as a feature for information processing.

Figure 3A:
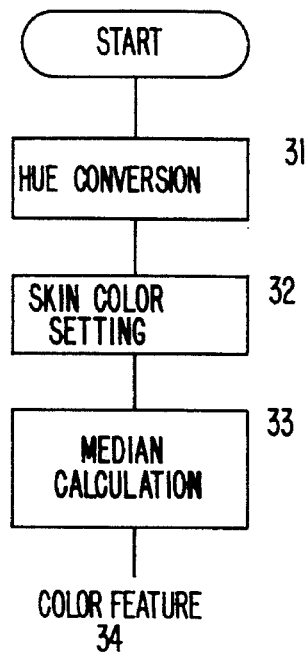
FIG. 3 (A) is a flow chart showing a procedure for performing calculations relating to color information of face.
Figure 3B:
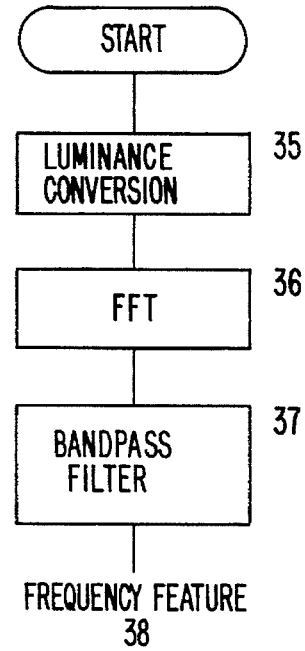
Figure 4:
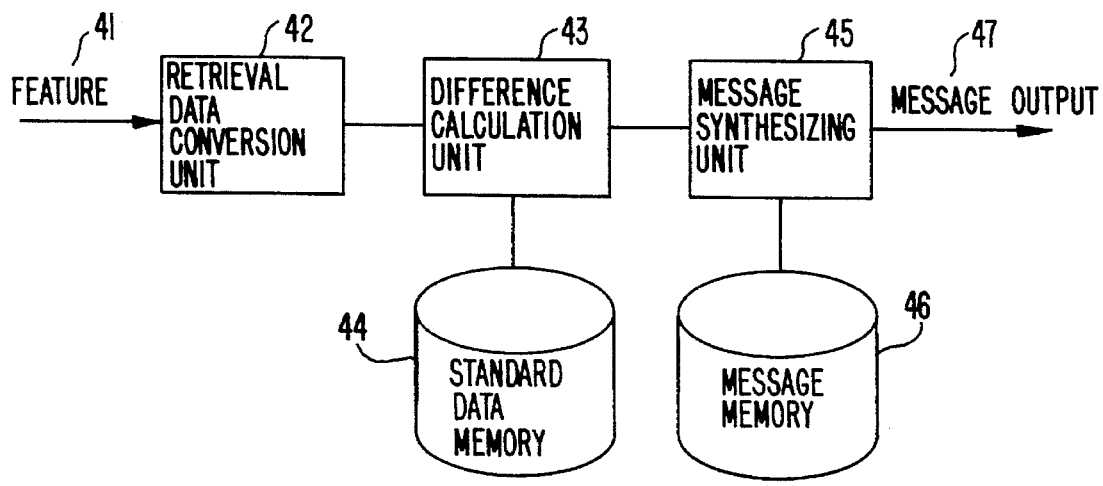
FIG. 4 is a block diagram of an exemplary embodiment of the output unit in FIG. 1.

FIG. 3 (A) is a calculation flow chart relating to color information of a face, and FIG. 3 (B) is a calculation flow chart relating to texture information (frequency feature).

Referring to FIG. 3 (A), the calculation of color information is explained. At step 31, concerning R, G, B values expressing the pixels of the facial image by the values of red, green and blue, the color is converted into a hue value expressed by one point on number lines from 0 degree to 360 degrees. As an exemplary conversion formula, assuming red, green and blue of each pixel expressed in the range of 0 and 255 respectively to be R, G, B, the luminance value Y and hue value H can be calculated in accordance with formula 1.

$$Y = 0.299R + 0.587G + 0.114B$$

$$H = \tan^{-1}((R-Y)/(B-Y)) \tag{1}$$

In skin color setting at step 32, the range of hue of the skin color is set. For example, by determining the hue H ranging only from 350 degrees to 380 degrees, the skin color portion is set. In the median calculation at step 33, by calculating the pixels corresponding to each H value in the preset skin color region, the value of the H (median) of the pixels corresponding to the half of the entire pixels is calculated. This generated median is the color feature 34. By comparing the color feature 34 with the standard facial color feature, it is judged whether the color tone of the input facial image is bluish or reddish.

Referring to FIG. 3 (B), the calculation of texture information is explained. In the luminance conversion at step 35, the R, G, B values of pixels are converted into the luminance Y in accordance with formula 1. The two-dimensional signal of the determined luminance Y is converted into a spatial frequency signal by fast Fourier transform by FFT at step 36. By passing the spatial frequency signal into a bandpass filter at step 37, the rate of the output signals contained in the upper limit and lower limit frequencies of the filter corresponding to the input signal is calculated. The calculated rate is a frequency feature 38 expressing one piece of texture information. When the upper lower limit frequencies of the bandpass filter at this step 37 is set in such a way as to pass the spatial frequency corresponding, for example, to wrinkles, it is possible to judge whether the input facial image is a much-wrinkled face or a less-wrinkled face.

Information processing in the output unit 14 in FIG. 1 is effected as follows. FIG. 4 illustrates a block diagram of an exemplary embodiment of the output 14 in FIG. 1. The feature 41 sent from the feature extraction unit 13 is converted into retrieval data used in information retrieval in a retrieval data converter 42.

Table 1 shows an example of retrieval data used in fortune-telling by physiognomy converted from the features of shape and position of elements for the face. First, the data type is described, which is followed by actual data. The interval of the eyeballs is calculated from the distance between points 240 and 250 in FIG. 2 and the lateral width of the nose is calculated from the distance between points 260 and 263 and normalized.

TABLE 1

| Data type | Actual data | Differential data |
|---|---|---|
| Interval of eyes | 0.46 | * |
| Lateral width of nose | 0.21 | * |

A difference calculation unit 43 calculates the difference of the standard data stored in a standard data memory 44 and the actual data in Table 1, and puts the difference in the differential data column in Table 1. In the standard data memory 44, standard data corresponding to each data type is stored. A message synthesizing unit 45 searches for a message corresponding to each data type from a message memory 46 by using the differential data in Table 1, and found messages are combined. A message output 47, or personal information, is produced at an output terminal.

Table 2 shows an example of data stored in the message memory 46 In each data type, the message corresponding to the magnitude of the differential data is stored.

TABLE 2

| Eye intervals | |
|---|---|
| 6.0> | You are temperamental. A little . . . |
| 6.0≦ | You are too particular about a specific thing. |
| Nose lateral width | |
| 2.0> | Bold and courageous in behavior. |
| 2.0≦ | Mentally weak. Bravery . . . |

Table 3 is an example of message output 47. Such message may be displayed in a display unit, or printed on paper.

TABLE 3

<General>
    You are generally timid.
    But you can concentrate
    efforts on what you like.
<Money fortune>
    Save steadily.
    Don't spend too much.

Save steadily.

Don't spend too much.

By using the calculation results of facial color and spatial frequency as explained by reference to the flow chart in FIG. 3, in addition to fortune-telling, advice on health and age can be also created.

Moreover, by using the feature of the input facial image, the feature of other facial image entered separately, or plural features already stored, the features of two or more different faces, for example, a man's face and a woman's face can be calculated. Messages corresponding to a combination of each data type are stored in the message memory 46 in FIG. 4. By retrieving and synthesizing the messages, matchmaking can be performed.

Figure 5:
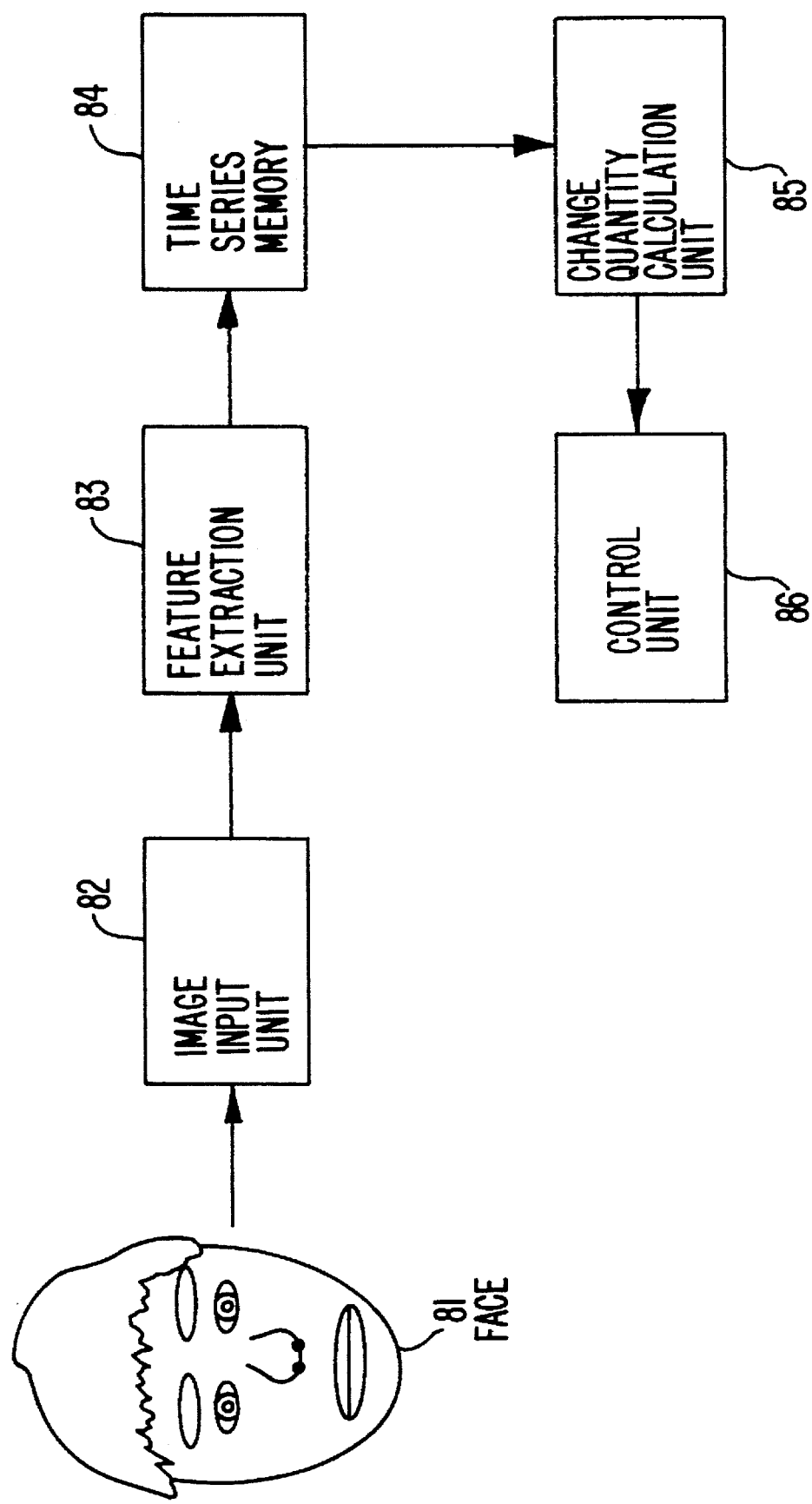
FIG. 5 is a block diagram of a further embodiment of the invention.

FIG. 5 is a block diagram of a further exemplary embodiment of the present invention. This embodiment makes use of time variations of features. An image input unit 82 sends the facial image to a feature extraction unit 83 at specified sampling time intervals (in accordance with data sampling techniques which are well-known in the art). The feature extraction unit 83 extracts the feature in every sample. A time series memory 84 stores the feature of every sample from the feature extraction unit 83. A change quantity calculation unit 85 calculates the time variation quantity of each feature from the time series data of the feature read out from the time series memory 84.

Supposing that, as the feature, the two-dimensional coordinates of shape and position of elements forming the face are used as shown in FIG. 2. The central coordinates of the face are the central coordinates of each horizontal coordinate of the crown 210 and jaw 214, and the distance of the central coordinates and the horizontal coordinate between the left and right eye end points 253 and 243 is the rate of the left and right halves of the face. By the time variation of the rate of left and right halves of the face, the rotation of the face in the horizontal direction is determined. For example, an increase of the rate of the left half of the face indicates rotation of the face to the left direction.

Supposing the vertical position of the eye to be the mean of vertical coordinates of points 241, 243, 253, and 251, and assuming the distance from the mean coordinate to the vertical coordinate of the crown 210 and the distance to the vertical coordinate of the jaw 214 to be the rate of the upper half of the face and the rate of the lower half of the face, the motion in the vertical direction such as the tilting up and down of the face can be calculated from the time variation of these rates.

Such calculation results of time variation of features are transmitted from the change quantity calculation unit 85 to a control unit 86 to be used as the input for negating the rotation of the face in the horizontal direction or the input for affirming the motion of the face in the vertical direction. This enables input of yes or no without resort to key operation in a quiz game.

The amusement apparatus in accordance with the present invention employs a facial image as a novel input. Therefore, it offers a new fortune-telling apparatus, matchmaking device or game machine. The facial features are unique for every person, and the relation to character, health and fortune can be expressed equally or more reliably as compared with the name and birthday, and therefore the amusement apparatus of the invention for telling characters and fortunes on the basis of the information of facial image presents excellent effects which are high in reliability without any sense of strangeness.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A computer implemented method of providing entertainment by simulating fortune-telling and character-telling, comprising the steps of:

storing, in a message memory, a plurality of entertaining messages relating to at least one of simulated fortune-telling and character-telling, each one of said plurality of entertaining messages corresponding to a respective facial element value, converting a facial image into a two-dimensional image comprising a plurality of facial elements, extracting a plurality of features from the two-dimensional image, wherein each feature of said plurality of features corresponds to a element of said plurality of facial elements, calculating a plurality of normalized features, wherein each normalized feature is calculated from a respective extracted feature of said plurality of extracted feature, calculating a plurality of facial element values for each one of said plurality of facial elements, each one of said plurality of facial element values is the difference between each one of said plurality of normalized features and a respective one of a plurality of standard features, searching said message memory for a plurality of messages, wherein each message corresponds to the respective facial element value of each respective facial element of said plurality of facial elements, retrieving each one of said plurality of messages, each one of said plurality of retrieved messages relating to at least one of simulated fortune-telling and simulated character-telling, and outputting each one of said plurality of retrieved messages concurrently.

2. An amusement apparatus for providing entertainment by simulating fortune-telling and character-telling comprising:

storage means for storing, in a message memory, a plurality of entertaining messages relating to at least one of simulated fortune-telling and character-telling, each one of said plurality of entertaining messages corresponding to a facial element value, input means for converting a facial image into a two-dimensional image comprising a plurality of facial elements, feature extracting means for extracting plurality of features from the two-dimensional image, wherein each feature of said plurality of features corresponds to a respective facial element of said plurality of facial elements, feature normalizing means for calculating a plurality of normalized features, wherein each normalized feature is calculated from a respective extracted feature of said plurality of extracted features, calculating means for calculating a plurality of facial element values for each one of said plurality of facial elements, each one of said plurality of facial element values is the difference between each one of said plurality of normalized features and a respective one of a plurality of standard features, means for searching said message memory for a plurality of messages, wherein each message corresponds to the respective facial element value of each respective facial element of said plurality of facial elements, retrieval means for retrieving each one of said plurality of messages each one of said plurality of retrieved messages relating to at least one of simulated fortune-telling and simulated character-telling, and output means for displaying each one of said plurality of entertaining messages concurrently.

3. An amusement apparatus according to claim 2, wherein the feature extracting means comprises:

means for extracting a plurality of coordinates and a distance for expressing the shape and position of each one of said plurality of extracted features and its respective normalized feature of said plurality of normalized features of each reflective facial element from the two-dimensional image.

4. An amusement apparatus according to claim 2, wherein the feature extracting means comprises:

means for extracting a skin color value by calculating color information from the two-dimensional image, and means for extracting texture information from the two-dimensional image.

* * * * *

UNITED STATES PATENT AND TRADE MARK OFFICE
CERTIFICATE OF CORRECTION

PATENT NO.   : 5,479,529
DATED        : December 26, 1995
INVENTOR(S)  : Nakagawa et al.

It is certified that error appears in the above-identified patent and that said Letters Patent is hereby corrected as shown below:

Column 5, line 31, after "a" insert --respective facial--.

Column 5, line 35, delete "feature" (2nd occurrence) insert --features--.

Column 6, line 8, after "a" insert --respective-.

Column 6, line 12, before "plurality" insert --a--.

Column 6, line 32, between "messages each" insert a comma --,--.

Column 6, line 43, delete "reflective" and insert --respective--.

Signed and Sealed this

Tenth Day of September, 1996

Attest:

BRUCE LEHMAN

Attesting Officer

Commissioner of Patents and Trademarks